Dec. 22, 1936.  B. S. BUFORD  2,065,047
INSECT EXTERMINATING LAMP
Original Filed Sept. 18, 1934  2 Sheets-Sheet 1

Inventor
Birdie S. Buford,
By Clarence A. O'Brien
Attorney

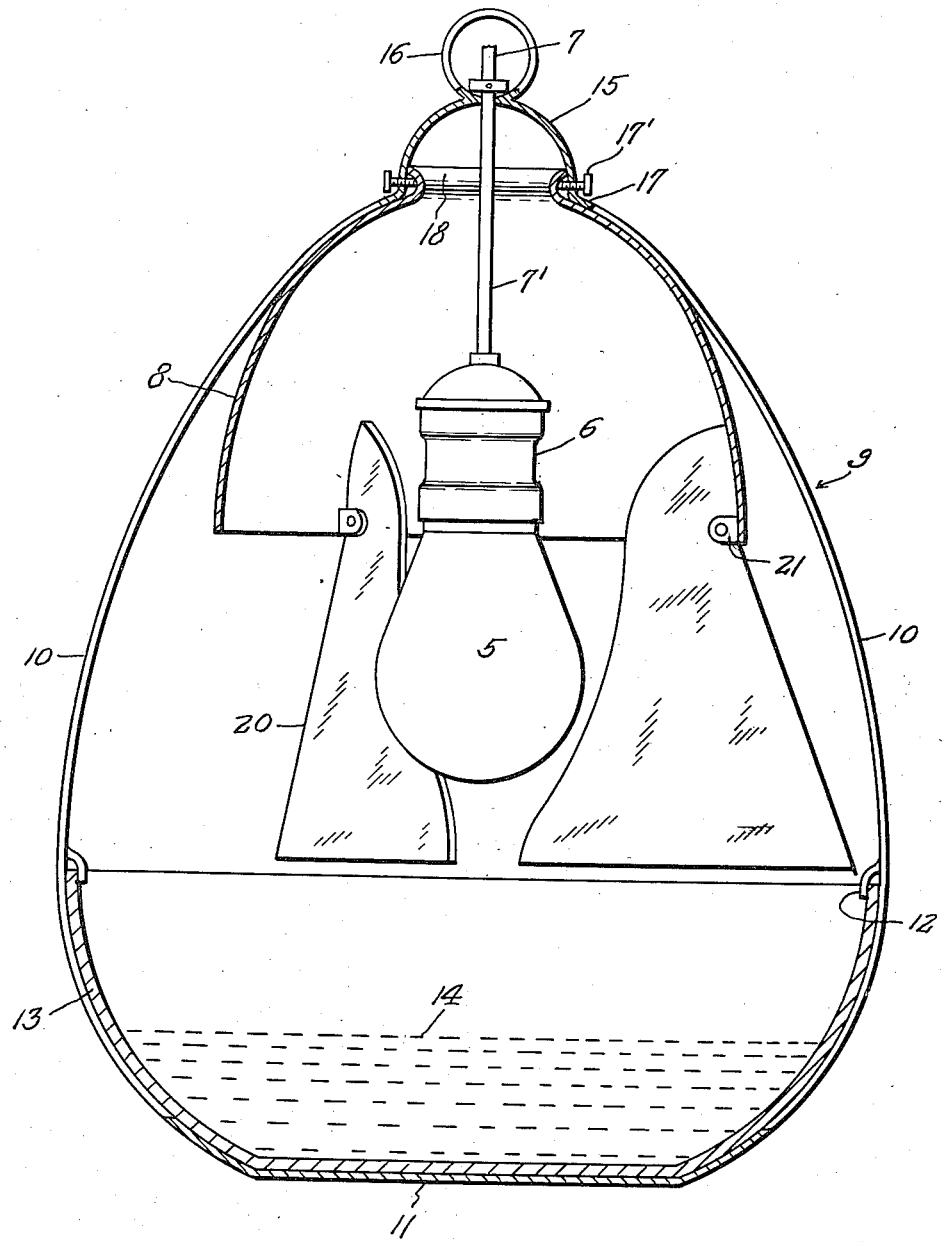

Patented Dec. 22, 1936

2,065,047

UNITED STATES PATENT OFFICE 2,065,047

INSECT EXTERMINATING LAMP

Birdie Smith Buford, Wilson, N. C.

Application September 18, 1934, Serial No. 744,587
Renewed July 20, 1936

1 Claim. (Cl. 43—113)

This invention relates to an unusual combination structure expressly designed and developed to serve the two-fold purpose of a source of illumination on the one hand, and as an insect trap on the other.

It is doubtlessly well-settled that many varieties of bugs and insects are attracted toward and congregate about electric and similar lighting equipment. It follows, therefore, that where beach cottages and the like are concerned and where proper screening facilities are lacking, the occupants of the place of abode are seriously annoyed by the presence of such pests. Innumerable precautionary measures are resorted to by persons to minimize this discomfort. It is undesirable, however, for one to deprive himself of proper lighting facilities and it therefore becomes a task, under certain conditions to cope with the situation.

Availing myself of the attraction of light for these pests, I have therefore evolved and produced a novel device which is both a lamp as well as an insect trap. Hence, in reducing the invention to practice, I have perfected a simple and expedient structure whose features have been carefully and thoughtfully selected and appropriated in an ornamental as well as a utilitarian capacity.

By way of introduction it might well be pointed out that the invention has to do with an ingenious structure which is unique and odd and sufficiently well balanced as to promote a degree of appeal reasonably expected to satisfy the demands of users impressed by appearance as well as by practicability and utility.

The preferred embodiment of the invention bears a striking similarity to an old-fashioned ceiling type lamp of the oil burning variety and at the same time displays an appearance and effect tending to resemble the more modern inverted bowl-type electric lamp.

The general purpose of the invention is to provide a simple and economical electric bulb-equipped lamp characterized by an appropriate hanger and reflector, and the specific purpose is to associate with said reflector a secondary underlying bowl-type reflector which is in effect an insecticide containing and trapping receptacle.

As will be hereinafter pointed out more explicitly, the inventive conception involves a principle of insect destruction and trapping of a reliable form using an electric bulb as the attracting means, and a transparent barrier as baffle means for casting the insects into the insecticide in the bowl.

Other features and advantages calculated to meet the requirements of the trade will become more readily apparent from the following description and drawings:

In the drawings:

Figure 4 is a complete assembly view showing the parts in elevation and section and disclosing their relative arrangement and association.

Figure 1:
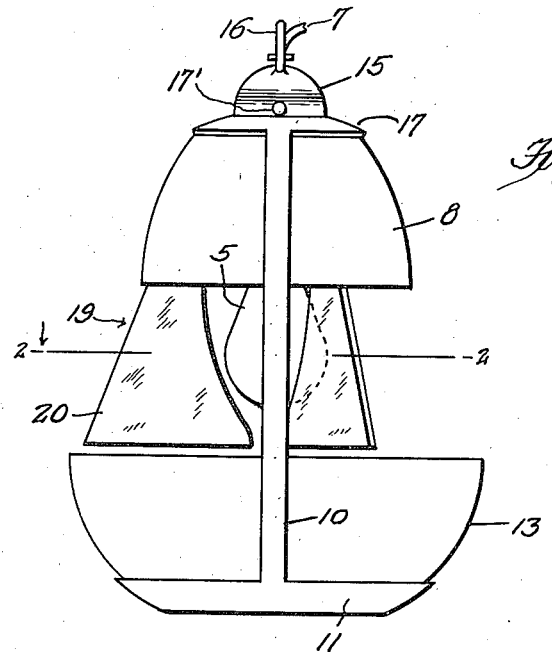
Fig. 1 is an elevational view of the bowl or duplex type lamp and trap constructed in accordance with the principles of the present inventive conception.
Figure 2:
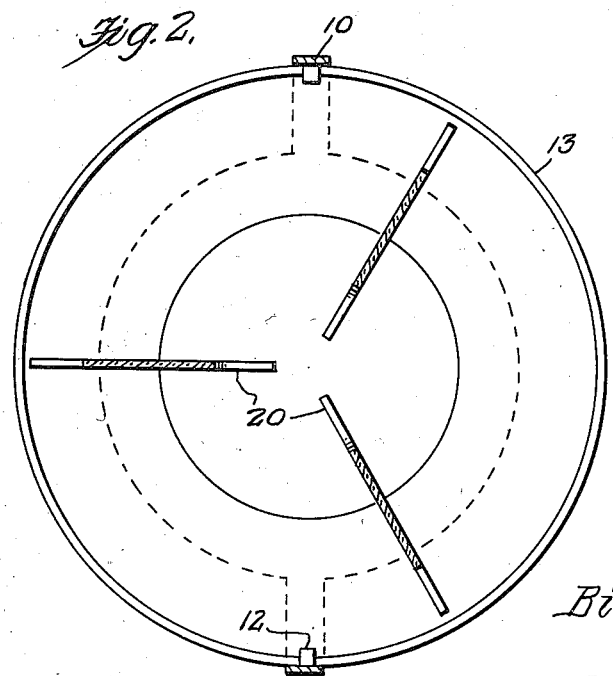
Fig. 2 is an enlarged sectional view which may be said to be taken on the plane of the line 2—2 of Figure 1 looking downwardly.
Figure 3:
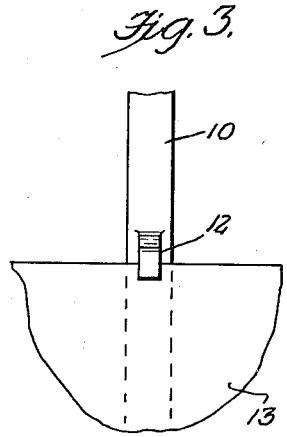
Fig. 3 is a fragmentary detail view showing one of the clips in the hanger for holding the bowl in place.

Referring to the drawings by distinguishing reference numerals, it will be observed that the preferred embodiment of the invention comprises first a source of illumination. This is preferably in the form of a conventional incandescent electric bulb 5 carried by an appropriate socket 6 supplied current by a cord or cable 7, which passes through a tube 7' connected at its lower end to the socket. Associated with this is a semi-spherical shade or reflector 8 of suitable opaque material and reflecting capacity. These features are associated with a novel frame structure which may be described unitarily as a hanger 9. This hanger comprises a pair of diametrically opposed arms or straps 10 of appropriate dimensions and of longitudinally bowed formation, these being connected at their lower ends to a part 11 which may be conveniently differentiated as a pan. At a point above the pan the arms are provided with holding clips 12 of appropriate form to engage the upper marginal edge of a bowl 13. This bowl is somewhat larger than the shade or reflector 8 and is constructed of opaque material and preferably made on its interior to serve in the capacity of a secondary or supplemental reflector. That is to say, the light rays which are reflected downwardly from the main reflector 8 are again reflected upwardly by the inner surface of the bowl or secondary reflector 13. The bowl is adapted to contain a suitable insecticide or preparation 14. It is possible to use ordinary water coated with a film of oil. This serves, as a general proposition, to effectively trap and exterminate the insects.

Referring now to the upper part of the hanger, it will be observed that this includes a cap 15 provided on its crown portion with a suspension ring 16. The cap is provided with an annular flange 17 and thereby serves in the capacity of a canopy for the main reflector 8. As a matter of fact, this cap may include set screws 17' engageable with the supporting flange 18 of the reflector 8 (see Figure 4). The cap 15 also supports the tube 7' in any suitable manner with the tube of such length that the bulb 5 will be held below the bottom of the reflector and in the space between the reflector and bowl 13 as shown.

An essential feature of the invention, however, has to do with the provision of a unit which may be described broadly as a barrier 19. This is made up of several panes of ordinary transparent window glass. These panes 20 are supported in any suitable manner from the reflector 8 such as by the clips 21 with the lower ends slightly spaced from the top of the bowl, each pane having its outer edge sloping downwardly and outwardly from the clips with the outer edge above the clips contacting the reflector and the inner edge of each pane curving inwardly and downwardly at its upper end and then slightly bowed inwardly intermediate its end, so these portions of the inner edges of the panes provide a space for receiving the bulb and permitting the bulb to be removed and replaced, the lower portions of these inner edges of the panes extending inwardly and partly under the bulb as shown. It has been discovered that this device 19 is apparently invisible to the insects. At any rate, since they are attracted by the light, they fly against the wings 20 or panes and virtually are stunned and as a result drop down into the trapping fluid 14.

It is thought that a structure of this type, due to its peculiar usage will be found aptly fitted to promote valuable lighting and trapping results and will therefore be serviceable to the extent that it will be appropriately endorsed by the trade. As a matter of fact, by comparison with rival inventions, it appears to enter a field practically unoccupied by equivalent or similar devices. Although the ornamental aspect of the structure is not to be unnecessarily emphasized, it is understood that it provides its proportionate share in the development of a structure worthy of consideration by the prospective purchaser in need of a good out-of-doors porch lamp capable of providing light and at the same time trapping insects.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

What is claimed is:

A structure of the class described comprising a hanger including a dome having diverging arcuate shaped integral depending arms attached at their lower ends to a pan, said arms being provided intermediate their ends with bowl retaining clips, a bowl seated in said pan and held between said arms by said clips, said bowl serving as a reflector and having the additional function of a container for an insecticide solution, a depending reflector detachably connected in said dome and disposed between said arms, a bulb suspended from said dome and located below said reflector, and a barrier unit supported by said reflector and located in the space between the reflector and bowl and embodying transparent members spaced apart and located in spaced relation around the bulb.

BIRDIE S. BUFORD.